United States Patent [19]
Moline et al.

[11] 3,894,828
[45] July 15, 1975

[54] APPARATUS FOR ROLLING DOUGH STRIPS IN THE CROSS MACHINE DIRECTION

[75] Inventors: Donald V. Moline; James A. Larson, both of Duluth, Minn.

[73] Assignee: The Pillsbury Company, Minneapolis, Minn.

[22] Filed: Aug. 27, 1973

[21] Appl. No.: 391,713

[52] U.S. Cl. ......... 425/371; 425/373; 425/DIG. 55; 425/363; 425/335
[51] Int. Cl. .............................................. A21c 3/02
[58] Field of Search .......... 425/371, 372, 335, 337, 425/373, 366, DIG. 55

[56] References Cited
UNITED STATES PATENTS

| | | | |
|---|---|---|---|
| 1,134,970 | 4/1915 | Lawrence | 425/337 |
| 2,621,613 | 12/1952 | Anetsberger | 425/367 |
| 2,715,879 | 8/1955 | Sawyer | 425/DIG. 55 |
| 2,735,376 | 2/1956 | Stiles | 425/373 X |
| 2,945,261 | 7/1960 | Aykanian et al. | 425/DIG. 55 |
| 3,191,553 | 6/1965 | Rich et al. | 425/373 |
| 3,806,298 | 4/1974 | Remensperger | 425/371 |

OTHER PUBLICATIONS

Recknagel, "Nylon Parts for Ball Bearings", Feb. 1952, Product Engineering, pp. 119–123.

Zimmerli, "Designing Fabricated Nylon Parts," Mar. 1954, Machine Design, pp. 153–159.

*Primary Examiner*—Francis S. Husar
*Assistant Examiner*—David S. Safran
*Attorney, Agent, or Firm*—James V. Harmon; Michael D. Ellwein

[57] ABSTRACT

Apparatus is described for rolling dough at right angles to its direction of movement on a supporting conveyor. The dough is typically in the form of a strip supported on a belt conveyor. The apparatus includes rollers mounted for rolling movement in contact with the dough from a center point which coincides with the center of the dough strip laterally in opposite directions to each side margin of the strip or dough piece. The rollers are elevated after they reach the lateral edges of the strip, carried back toward the center of the strip. They are then brought in contact with the strip again and the cycle is repeated. The dough strip advances continuously under the rolls as the rolling operation is carried out.

8 Claims, 3 Drawing Figures

APPARATUS FOR ROLLING DOUGH STRIPS IN THE CROSS MACHINE DIRECTION

BACKGROUND OF THE INVENTION

1. Field of the Invention

The present application relates to dough rolling equipment.

2. The Prior Art

Equipment used for rolling dough strips in their direction of travel stretches the dough strip and does not widen the strip materially. The stress put in the dough in the machine direction often causes the strip to shorten later on or for cut pieces to change shape e.g. round pieces to become oblong. Moreover, this equipment often does not widen the strip enough.

The apparatus of the present invention rolls dough strips or line of pieces in the cross machine direction, in other words, at right angles to the longitudinal axis of the strip or line and to the direction of travel of the strip or line past the apparatus. As the dough strip travels beneath the rolls which act upon its upper surface, it was found that deflection of the rolls either upwardly or downwardly from the rectilinear path to be followed by the rolls could cause irregularities in the surface of the dough. It was also found that when the rolls were chain driven, the rolls could wobble or move erratically. This again caused irregularities in the dough surface. A further problem was the inability to accurately control the thickness of the roller dough. Another problem was the tendency for flour to be thrown from the chain onto the dough and for the roller bearings to become worn relatively quickly. Still another problem was caused by the rapid acceleration of the rolls as they contact the dough. This sudden start-up produced discontinuities in the dough. A further problem was the tendency for the dough to be stretched more at the center than at the periphery making the center of the strip thinner than its edges.

The Objects

The main objects of the invention are: (a) to provide an improved dough roller for rolling dough at right angles to its direction of motion with provision for reliably preventing irregularities in the dough surface, (b) a provision for restricting the rolls to a predetermined path of travel when in contact with the dough, (c) when chain driven, a provision for preventing the chain from allowing the rolls to wobble, (d) provision for accurately changing the height of the rolls (e) provision for preventing flour from being thrown onto the dough, (f) bushings for the rolls which will function reliably over an extended period of time and which are constructed in a manner to minimize sanitation problems and (h) a means for preventing the center of the dough strip from being rolled thinner than its edges.

THE FIGURES

FIG. 1 is a plan view of the invention FIG. 2 is a vertical sectional view taken on 2—2 of FIG. 1 and FIG. 3 is a vertical sectional view taken on 3—3 of FIG. 1 on an enlarged scale.

SUMMARY OF THE INVENTION

Apparatus is described for rolling the dough usually supported as a strip or a series of dough pieces end to end on a conveyor at right angles to its direction of motion on the conveyor i.e. at right angles to the longitudinal axis of the strip. Dough rolling means are mounted for rolling movement in contact with the dough and are advanced across the dough strip from the center of the dough strip laterally in opposite directions to each side edge. The rolling means is elevated after they reach the edges of the strip. They are then carried back toward the center axis of motion of the dough, are again brought in contact with the dough and advanced laterally to repeat the cycle continuously. The dough strip is carried by the conveyor continuously under the rolls as the rolling operation is carried out. The apparatus comprises a supporting framework which is adapted to be mounted over the moving body or bodies of dough being worked on. A dough rolling means is mounted upon the framework with the dough rollers generally parallel to the axis of motion of the dough strip i.e. parallel to the longitudinal axis of the dough strip and the rolling means is supported for rotation upon its own axis and for translational movement while held in contact with the dough strip from the center of the dough strip to the left side of the framework and from the center of the dough strip to the right side of the framework along laterally extending paths generally perpendicular to the axis of the rolling means to thereby spread the dough strip laterally as the rolling means move outwardly from the center to the side edge of the dough strip. A drive such as an electric motor is provided for imparting rectilinear motion to the rolls along the laterally extending paths. Concerning the rotation upon their own axes, the rolls can be either driven or undriven. Elevating means is provided for the rolling means to lift it away from the dough when traveling from the periphery of the apparatus back to the center. In one preferred form of the invention, a guide means is provided to support the rolls when in contact with the dough against both upward or downward deflection, thereby restricting the rolls to a predetermined path of travel at all times while in contact with the dough.

When the rolls are supported at each end from a drive chain, a tightner means is provided for taking up slack in the chain to thereby hold the chain tight and a height regulator is provided for allowing the thickness of the dough to be changed. When flour or starch is used for coating the dough or rollers or both, a flour catch pan is provided to receive excess flour that would otherwise fall onto the dough.

Further in accordance with the preferred form of the invention, when the rollers function as idlers and are not driven, a roll accelator means is provided for imparting rotation to each roll on its own axis before it comes into contact with the dough.

Further in accordance with the preferred form of the invention, two sets of rolls are provided, one set being mounted so as to contact the dough while moving from the center toward the left side thereof and the other while moving from the center toward the right side thereof. The rolls at the center are elevated a slight distance so as to travel toward the periphery of the strip on a slight downward incline.

The rolls can be elevated after they have performed their desired function and have traveled either to or beyond the edge of the dough strip in any of a number of ways, for example, by means of having their axels supported upon endless chains entrained over central and lateral sprockets so that the rolls describe an oblong path traveling from the center of the dough strip laterally to its edge, then upwardly and centrally whereupon the rolls move downwardly again into contact with the dough and again travel laterally. The term "dough strip" herein refers to a continuous strip, a cut strip or a series of dough pieces arranged in a line as on a conveyor belt.

DESCRIPTION OF A PREFERRED EMBODIMENT

Figure 1:
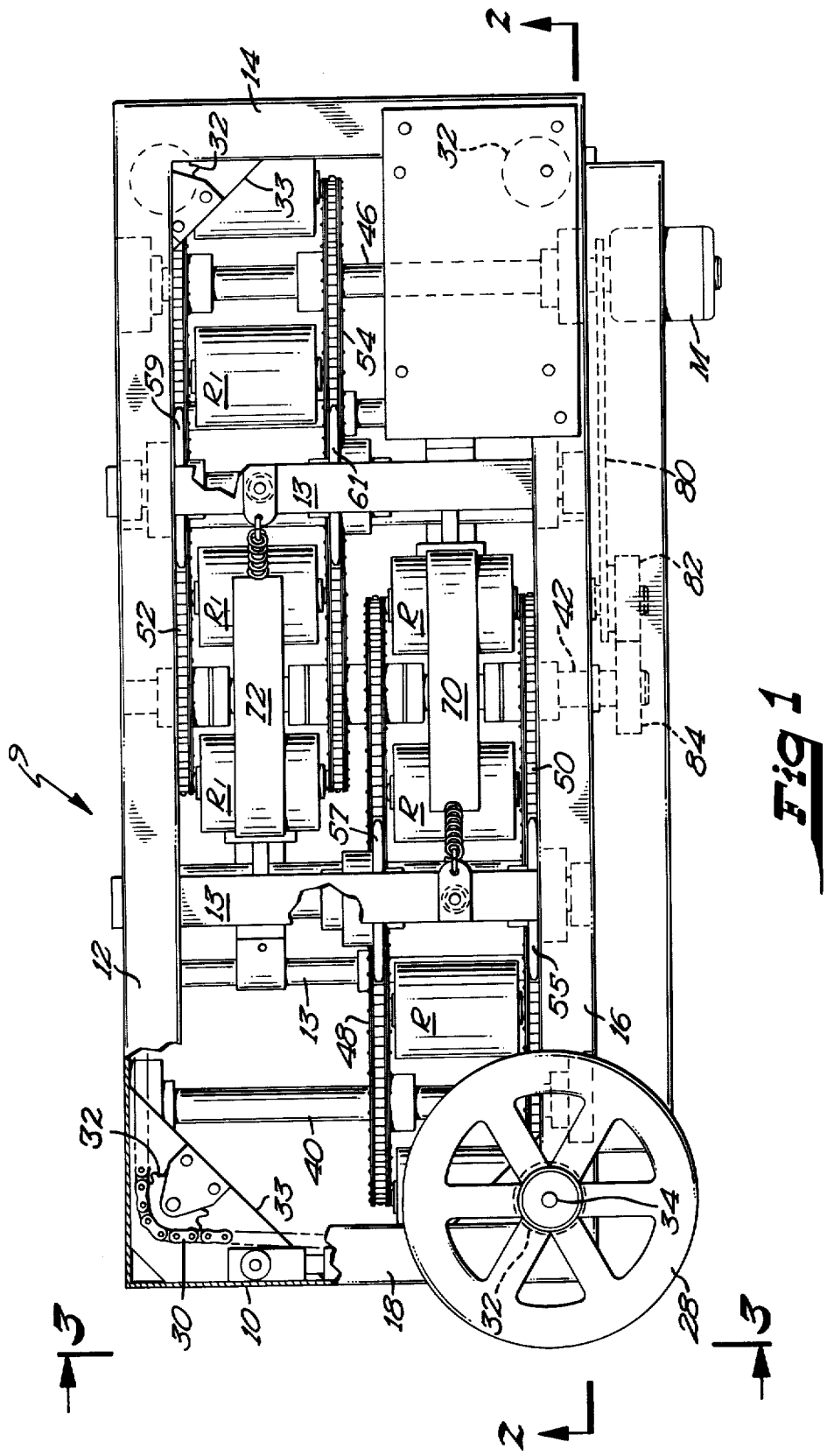

Refer now to the Figures which illustrate the dough rolling apparatus 9. The apparatus includes a rectangular housing 10 formed from sheet metal and including four vertically disposed side walls and a horizontal top wall divided into four sections 12, 14, 16 and 18 (FIG. 2), cross members 13 held rigidly in position for example by welding and having four legs 20 one at each corner in the apparatus. The legs extending downwardly therefrom (only two of which can be seen in each of FIGS. 2 and 3). The bottom of the legs are connected to suitable brackets 22 mounted rigidly upon the conveyor supporting housing 26 that is used in conjunction with the invention. The legs 20 are raised and lowered simultaneously by the provision of a hand wheel 28 connected via endless chain 30 entrained over suitable sprockets 32 each mounted thereon for rotation in a support bracket 33 (FIG. 2) to turn leg elevating screws 34 each screw threaded through the top of the corresponding leg 20. By this means, the turning of wheel 28 will move endless chain 30 thereby turning each of the sprockets 32 and corresponding screws 34 simultaneously in the same direction and at the same speed so as to raise or lower the legs 20 as needed and adjust the clearance between the apparatus 9 and the conveyor housing 26. In the initial installation of the apparatus 9, accurate leveling is accomplished by adjusting bolts B (FIG. 2) in slots 21 preferably with feeler gauges between the rolls R and R¹ and the conveyor belt 27 or in the alternative by an adjustment screw (not shown) at the lower end of each leg.

Figure 2:
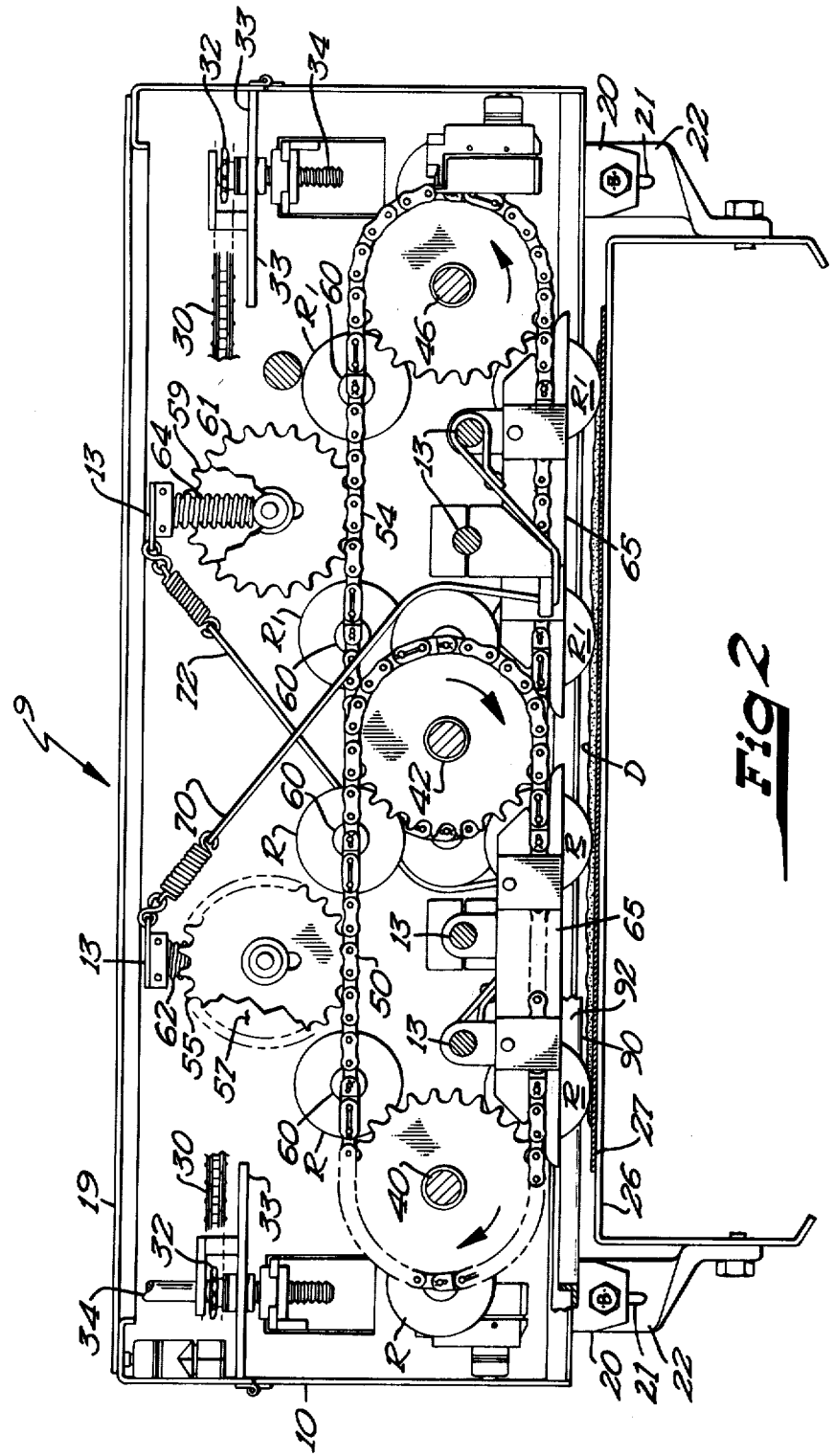

As seen in FIG. 2, an endless belt conveyor 27 is supported on the upper surface of the housing 26 so as to move along the length thereof i.e. away from the observer as seen in FIG. 2 and resting on this conveyor is a dough strip D or other dough product such as cut pieces e.g. folded pieces of puff pastry.

The dough rolling assembly is mounted upon three transversely extending support shafts 40, 42 and 46. Entrained between the first two over suitable sprockets are drive chains 48 and 50; entrained between the second two over suitable sprockets are drive chains 52 and 54 having mounted between them a first and second set of six dough compressing idler rolls R and R¹ respectively. Each of the rolls R and R¹ is formed from polytetrafluoroethylene and is suitably mounted on a bushing 60 which is preferably formed from a plastic resin such as nylon.

Figure 3:
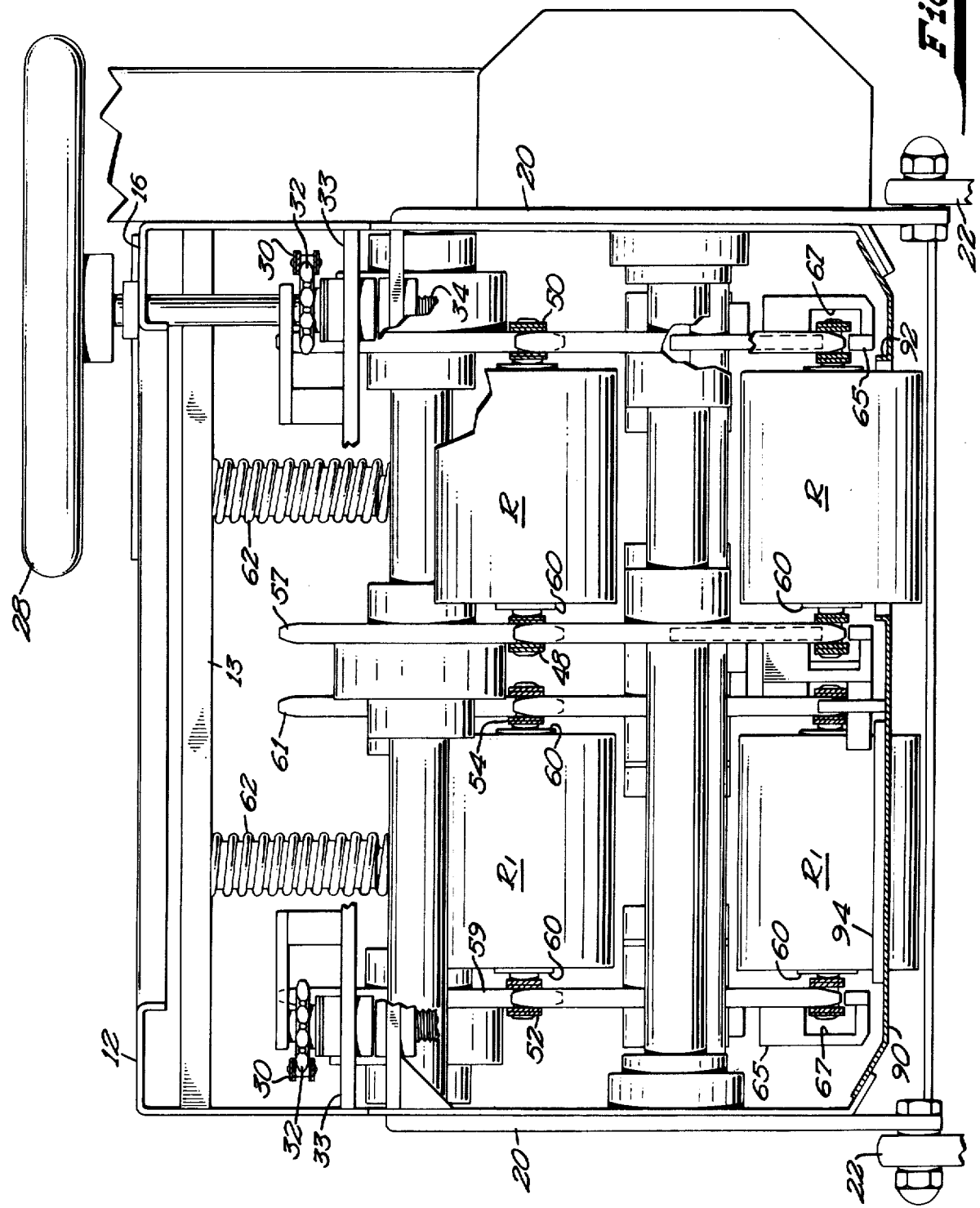

The chains are kept tight by the provision of wear take-up sprocket pairs 55, 57 and 59, 61 supported above their corresponding chains from cross braces 13 and biased downwardly by the provision of two pairs of compression springs 62 and 64. As seen in FIGS. 2 and 3, the lower run of each of the chains is supported or guided so that they may be prevented from both upward and downward deflection by guides 65 suitably mounted rigidly on the housing 10 and having a recess 67 (FIG. 3) the lower edge of which prevents the chain from being deflected downwardly and the upper edge of which prevents the chain from being deflected upwardly. This keeps the rolls at the proper elevation at all times.

The rolls R are accelerated to correspond with the speed at which they travel across the upper dough surface by provision of stationary roll engaging belts 70 and 72 which are secured at their upper ends to tension springs which are in turn connected to cross braces 13 with the belts in position to be engaged by the rolls R and R¹ respectively. As the rolls engage the belts, friction accelerates the roll surfaces so that they rotate on their bushings 60 at the proper speed to engage the surface of the dough strip D without having to speed up which could damage the dough.

The shaft 42 is elevated slightly, for example about 1/32 inch above the shafts 40 and 46 to cause the rolls to be somewhat higher at the center of the dough strip D. This prevents the dough strip from being drawn too thin at its center.

One suitable drive arrangement shown in FIG. 1 is to provide a motor M on shaft 46, driving chains 52 and 54 and the associated rolls R¹ in the directions shown in FIG. 2 and the rolls R via chain and sprocket assembly 80 through meshed gears 82 and 84, the second of which is mounted on shaft 42, to advance the rolls R at the same speed as rolls R¹ but in the opposite direction. While one mode of driving the rolls has been illustrated by way of example, many others will be apparent to those skilled in the art.

As shown in FIG. 3, there is removably mounted a flour catch pan 90 having a transversely extending opening 92 of just the proper size to accomodate the rolls R¹ where they extend below the pan 90 and a second opening 94 of just the proper size to allow the rolls R¹ to extend below the pan into contact with the dough strip D. When a run has been completed, the pan 90 is taken out to remove the flour which has been thrown off the chain and has accumulated in the pan 90.

In operation, with the roll support chains 48–54 and their corresponding sprockets turning in the directions shown in FIG. 2, the rolls R will spread the dough toward the left as seen in FIG. 2 and R¹ to the right thereby widening the dough strip and smoothing its upper surface. The belts 70 and 72 will through contact with the rolls initiate their rotation to the surface speed at which the rolls travel across the dough strip D. Adjustments in dough sheet thickness can be easily and accurately made by hand wheel 28.

It will, of course, be understood that various details of construction may be varied through a wide range without departing from the principles of this invention and it is, therefore, not the purpose to limit the patent granted hereon otherwise then necessistated by the scope of the appended claims.

What is claimed is:

1. An apparatus for rolling dough strips in the cross machine direction comprising a supporting framework adapted to be suspended over a dough strip, dough spreading rolling means mounted upon the framework for movement while positioned in operative contact with the dough strip from the approximate center of the apparatus to the left side thereof along a lateral path of travel perpendicular to the axis of the rolling means and from the approximate center of the apparatus to the right side thereof to thereby spread the dough strip laterally of its central axis toward each side edge thereof when each rolling means moves outwardly on the lateral axis, elevating means to lift the rolling means away from the dough when they travel from the periphery of the apparatus to the center thereof, thereby holding the rolling means out of contact with the dough and guide means operatively associated with the rolling means to support the rolling means when in contact with the dough against upward or downward deflection and thereby restrict the rolling means to predetermined elevations at all times while moving from the center to the periphery of the dough strip.

2. An apparatus for rolling dough strips in the cross machine direction comprising a supporting framework adapted to be suspended over a dough strip, dough spreading rolling means mounted upon the framework for movement while positioned in operative contact with the dough strip from the approximate center of the apparatus to the left side thereof along a lateral path of travel perpendicular to the axis of the rolling means and from the approximate center of the apparatus to the right side thereof to thereby spread the dough strip laterally of its central axis toward each side edge thereof when each rolling means moves outwardly on the lateral axis, elevating means to lift the rolling means away from the dough when they travel from the periphery of the apparatus to the center thereof, thereby holding the rolling means out of contact with the dough and a flour catch pan removably mounted in the lower portion of the apparatus, said flour catch pan having openings therein for the rolling means to extend downwardly therethrough into contact with the dough.

3. An apparatus for rolling dough strips in the cross machine direction comprising a supporting framework adapted to be suspended over a dough strip, dough spreading rolling means mounted upon the framework for movement while positioned in operative contact with the dough strip from the approximate center of the apparatus to the left side thereof along a lateral path of travel perpendicular to the axis of the rolling means and from the approximate center of the apparatus to the right side thereof to thereby spread the dough strip laterally of its central axis toward each side edge thereof when each rolling means moves outwardly on the lateral axis, elevating means to lift the rolling means away from the dough when they travel from the periphery of the apparatus to the center thereof, thereby holding the rolling means out of contact with the dough and said rolling means comprising a series of rollers each mounted for free rotation on its own axis and each roll is mounted upon a nylon bushing.

4. The apparatus of claim 3 wherein the rolls are formed from polytetraflouroethylene.

5. An apparatus for rolling dough strips in the cross machine direction comprising a supporting framework adapted to be suspended over a dough strip, dough spreading rolling means mounted upon the framework for movement while positioned in operative contact with the dough strip from the approximate center of the apparatus to the left side thereof along a lateral path of travel perpendicular to the axis of the rolling means and from the approximate center of the apparatus to the right side thereof to thereby spread the dough strip laterally of its central axis toward each side edge thereof when each rolling means moves outwardly on the lateral axis, elevating means to lift the rolling means away from the dough when they travel from the periphery of the apparatus to the center thereof, thereby holding the rolling means out of contact with the dough and said rolling means being supported upon drive chain means entrained over chain sprockets located at the approximate center of the apparatus and laterally thereof whereby the movement of the chain over the sprocket carries the rolls from a centrally located position to the side edge of the dough strip and back again and roll accelator means mounted upon the framework in position to be engaged by the rolls before the rolls contact the dough surface whereby the engagement between the accelerator means and the rolls will cause the rolls to rotate just prior to their coming into contact with the dough surface thereby reducing friction between the rolls and the dough.

6. An apparatus for rolling dough strips in the cross machine direction comprising a supporting framework adapted to be suspended over a dough strip, dough spreading rolling means mounted upon the framework for movement while positioned in operative contact with the dough strip from the approximate center of the apparatus to the left side thereof along a lateral path of travel perpendicular to the axis of the rolling means and form the approximate center of the apparatus to the right side thereof to thereby spread the dough strip laterally of its central axis toward each side edge thereof when each rolling means moves outwardly on the lateral axis, elevating means to lift the rolling means away from the dough when they travel from the periphery of the apparatus to the center thereof, thereby holding the rolling means out of contact with the dough and said rolling means being supported upon drive chain means entrained over chain sprockets located at the approximate center of the apparatus and laterally thereof whereby the movement of the chain over the sprocket carries the rolls from a centrally located position to the side edge of the dough strip and back again and the rolling means being elevated at the center of the apparatus slightly higher than the elevation of the rolling means at the periphery of the dough strip whereby excessive thinning at the center of the strip is prevented.

7. The apparatus of claim 6 wherein the supporting chains include a first set of chains entrained over chain sprockets mounted upon a central supporting shaft and chain sprockets mounted on a shaft located at the left hand side of the apparatus and a second pair of roll supporting chains entrained over the central shaft and a shaft located at the right hand side of the apparatus, said right and left hand shafts being mounted at the same elevation and the central shaft being elevated above the elevation of the right and left hand shafts.

8. The apparatus of claim 5 wherein the accelerator means is a belt and frictional engagement between the belt and the rolls causes the rolls to rotate.

* * * * *